(12) United States Patent
Pallotta

(10) Patent No.: US 8,340,730 B2
(45) Date of Patent: Dec. 25, 2012

(54) SYSTEM AND METHOD FOR SAFELY BLOCKING MOBILE COMMUNICATIONS USAGES

(76) Inventor: George Allen Pallotta, The Woodlands, TX (US)

( * ) Notice: Subject to any disclaimer, the term of this patent is extended or adjusted under 35 U.S.C. 154(b) by 320 days.

(21) Appl. No.: 12/800,204

(22) Filed: May 11, 2010

(65) Prior Publication Data
US 2011/0281544 A1 Nov. 17, 2011

(51) Int. Cl.
*H04M 1/00* (2006.01)
(52) U.S. Cl. .......... 455/569.2; 455/418; 455/404.1; 455/550.1; 455/411; 455/441
(58) Field of Classification Search .......... 455/418–420, 455/404.1, 404.2, 569.2, 575.9, 466
See application file for complete search history.

(56) References Cited

U.S. PATENT DOCUMENTS

| | | | |
|---|---|---|---|
| 5,563,931 A * | 10/1996 | Bishop et al. | 455/404.1 |
| 6,405,033 B1 * | 6/2002 | Kennedy et al. | 455/414.1 |
| 6,751,205 B2 * | 6/2004 | Menon et al. | 370/328 |
| 6,782,240 B1 * | 8/2004 | Tabe | 455/66.1 |
| 7,177,623 B2 * | 2/2007 | Baldwin | 455/404.2 |
| 2006/0141960 A1 * | 6/2006 | Fernandez et al. | 455/127.1 |
| 2007/0072553 A1 * | 3/2007 | Barbera | 455/67.11 |
| 2008/0188198 A1 * | 8/2008 | Patel et al. | 455/404.2 |
| 2011/0077032 A1 * | 3/2011 | Correale et al. | 455/466 |
| 2012/0021717 A1 * | 1/2012 | Schmidt | 455/404.2 |

* cited by examiner

*Primary Examiner* — Sharad Rampuria
(74) *Attorney, Agent, or Firm* — PEI; Michael T Perkins

(57) ABSTRACT

A system and method for internally controlling a mobile communication system, the mobile communication system internally inhibiting communication of a mobile communication device when the communication device achieves a threshold of predetermined momentum, a motion monitoring routine internal to the mobile communication device initiates with device turn on and periodically updates momentum, inhibiting device usage if motion is sustained, when the motion monitoring routine does not detect device motion above the threshold no inhabitation is deployed and full usage including connection to a cellular network is available, a inhibit safety override is facilitated for emergencies or other circumstances, a time out of inhibit when motion has ceased below the threshold for a sustained period.

20 Claims, 11 Drawing Sheets

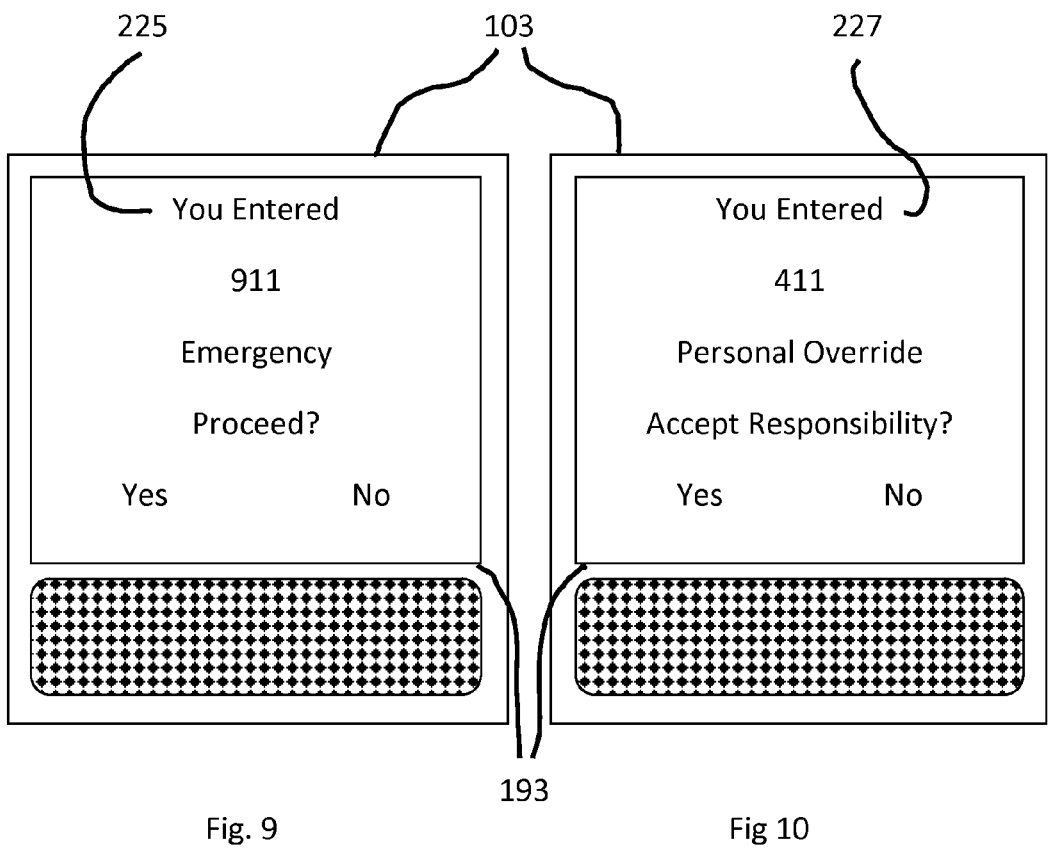

SYSTEM AND METHOD FOR SAFELY BLOCKING MOBILE COMMUNICATIONS USAGES

FEDERALLY SPONSORED RESEARCH

No

SEQUENCE LISTING OR PROGRAM

No

BACKGROUND

1. Technical Field of Invention

This invention relates to mobile communications for mobile devices and more particularly to such a mobile device with self-blocking control automatically restricting usage during movement beyond a preset threshold.

2. Background of the Invention

Mobile communication devices have enabled subscribing individuals to communicate with voice, text, email, and even video anywhere at any time. While this capability offers many benefits in 2009 the National Traffic Safety Association estimated that at least 25% of the traffic accidents were caused by or involved drivers that were distracted with mobile communication devices. A collection of state laws on distracted driving (6 pages) is referenced and appended. A great number of these resulted in property damage and deaths to innocent people. While no one should be deprived of finding where the closest Starbucks is located it should not be at the cost of an injury, loss of life, or property. Many versions of communication control have been proposed, attempted, and have provided some utility but none are able to meet the demands of current safety requirements on the highways and byways. Driving of automobiles, trucks, busses, and so forth require a variety of tasks that can be repetitive and boring but also may demand immediate alertness, quick reflexes and precision maneuvers with little or no warning.

Many self absorbed but otherwise intelligent individuals are able to deceive themselves that they can "multi-task" and continue to drive while "texting" or conversing on phones. Cognitive brain researchers are rapidly debunking the myth of "multi-tasking". A Stanford University study contained in the Stanford Report, Aug. 24, 2009; titled, "Media multi-taskers pay mental price" studied students that thought they could multi-task; they can't. Of the various proposed solutions to date external regional blocking has been proposed for such as school zones and other restricted zones using global positioning system (GPS) information by the cellular provider. The New York Times on Jan. 11, 2001 published an article on "Taking offensive against cell phones" using localized jamming techniques. One product available on the Internet offers a software module lease application that works only with GPS and location that will stop screen display interaction but still allows audio usage and can be worked around with a simple setup adjustment with no record of disabling the inhibit. These methods have some effect and side effects that have no ability to accommodate safety and may block unintended connections with the centralized design and known signal corruption during transmission. Additionally, operators with knowledge of imposed thresholds may become further distracted by trying to circumvent imposed threshold by traveling just under the known threshold. While some provisions for safety (911 calls) are mentioned in some of the prior efforts the ability to react and override the restriction would at best slow the immediate reaction required and perhaps cost lives.

SUMMARY OF THE INVENTION

Limitations of the prior techniques are overcome, safety, and technical advances are achieved in accordance with the present invention wherein device self-contained motion detection apparatus implements self-blocking of mobile communication.

In accordance with an illustrative embodiment of the present invention, all mobile communication devices are required to have a built in functional GPS receiver and communicate location to the provider's network, the information from the GPS receiver is operated upon and a velocity is inferred when the velocity exceeds a threshold communication to and from the device is halted until the velocity has reached a value less than the threshold or the operator enters a 911 for emergency (car-jacking, fire, or such safety situation) or 411 for personal liability (where the operator is a passenger in a vehicle).

Alternative embodiments provide similar self-control of devices to implement restrictions of texting, voice, movie watching, and similar mobile distractions.

BRIEF DESCRIPTION OF THE DRAWINGS

FIG. 9 shows a typical comm blocker display when not restricted with safety override FIG. 10 shows a typical comm blocker display when not restricted with personal override

DETAILED DESCRIPTION OF THE DRAWINGS

Figure 1:
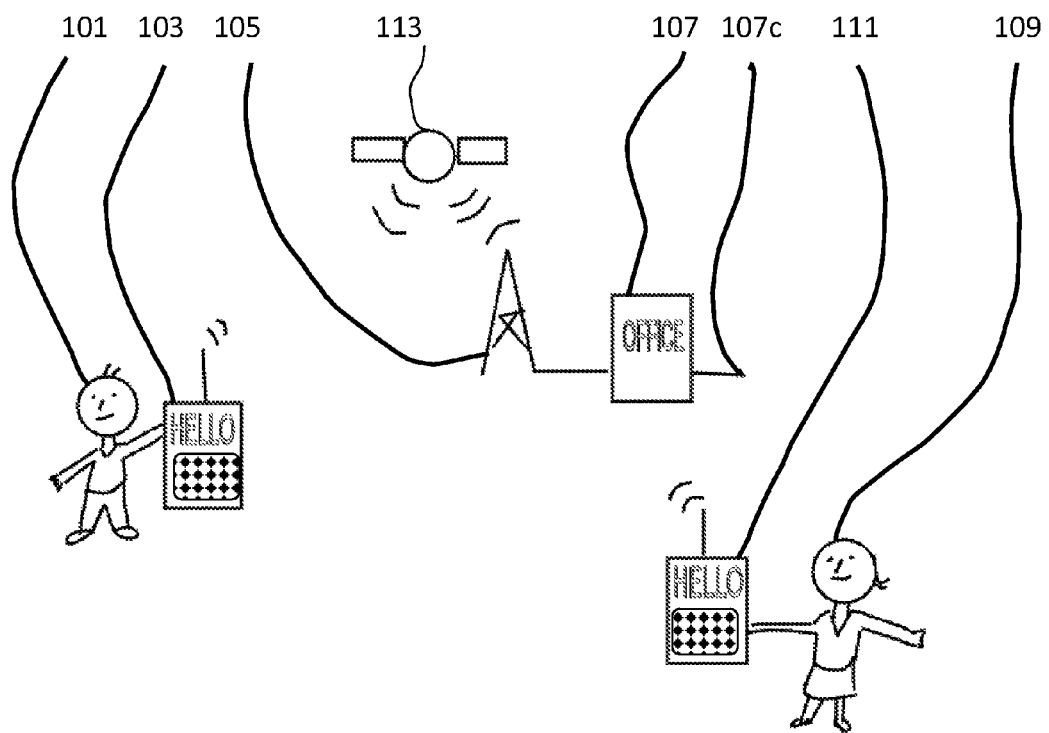
FIG. 1 shows a typical operator communicating

FIG. 1 shows a typical operator communicating through a portable device. The operator 101 is shown communicating through a portable device 103 with a display showing "Hello" and a simulated keyboard. The device 103 is employing a cellular tower 105 that is supported by a provider's central office 107 to another operator 109 with an additional portable device 111. The portable device 103 represents any communication device that can be transported and might be operated in a vehicle or similar mode of transportation. The providers central office 107 can communicate with virtually anywhere in the world through additional connections to satellites and a cable trunking 107c. The cable trunking 107c is typical inter-central office backbone connectivity that may be by hard line, microwave, fiber, or other connection. A global position satellite 113 is also shown as a representative portion of a global position system (GPS) constellation that can be utilized as a timing and position locating device. The GPS transmissions highly accurate timing signals can also be used for motion and velocity measurements to detect when portable devices such a device 103 when equipped with GPS receivers are in motion and specifically how fast they are moving. All portable communicating devices, by Federal Communications Commission (FCC) mandate, sold in the United States of America have had GPS receivers since 2005 (E911 compatibility). The power of the possibility of communicating virtually anywhere at any time with anyone is very powerful and a capability that many take for granted that was unheard of just 20 some years ago. The combination of GPS and other features on mobile communicating devices have added tracking; examples of thwarted attempts of kidnapping and auto theft have been reported. This is truly a useful advance of technology that is benefiting people everywhere. However with all power comes responsibility and most every user of portable communication devices have shown a lack of respect for the compromise that mobile communications can have on a driver's ability to operate a vehicle safely.

Figure 2:
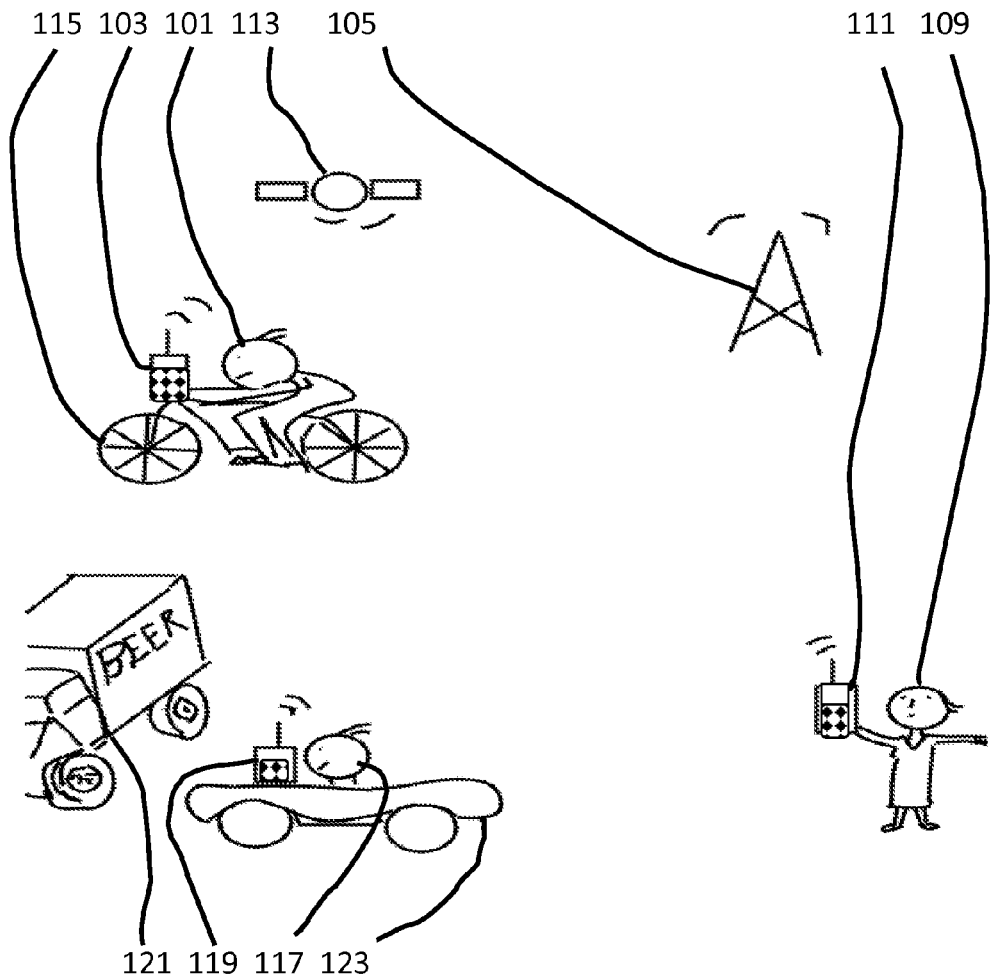
FIG. 2 shows a typical operator communicating while driving

FIG. 2 shows a typical operator communicating while driving. In FIG. 2 operator 101 is riding a bicycle 115 while communicating through device 103 over tower 105 to operator 109 with device 111. The availability of satellite 113 makes movement or speed of device 103 detectable and with machine executable code speed beyond a safe threshold can be determined. Also in FIG. 2 another operator 117 in a vehicle 123 is communicating over another portable communication device 119 over tower 105 to operator 109 with device 111. The operator(s) 101 and 117 in vehicles; a bicycle 115 and a car 123 respectively can be communicating separately or in a conference call to operator 109. The operator(s) 101 and 107 are shown in motion in their respective vehicle(s) with a hazardous obstacle 121 ahead on the road such as a Beer Truck. The Beer Truck is used as an example of the many hazards that appear to unsuspecting drivers everyday on the highways and byways of the world to highlight the danger presented by the distraction of portable communication devices when used while piloting a vehicle. Although the bicycle 115 has much less danger of injuring other property and vehicles the operator is at great risk at all times when piloting the highways and byways especially when distracted with a communication device. While operator(s) are shown piloting bicycle(s) and car(s) any type of vehicle such as a recreational vehicle, truck, motor bike, boat, train, etc. are meant to be included in this system implementation. Some regulations have demanded that operators use speakerphones or headsets while driving and operating a portable communication device but this regulation does not remove the distraction caused by operating such a device it merely frees the drivers' hands while the main problem is the brain's inability to react to emergencies when distracted. Recently short text messages have become very popular allowing individuals to communicate with a few words, code, or symbols. This "texting" or "tweeting" type communication over portable communication devices is considerably more distracting as although perhaps of shorter time duration than a conversation the operator must locate the appropriate keys to compose the intended message, review the message and send the message causing blind operations beyond just being distracted.

Figure 3:
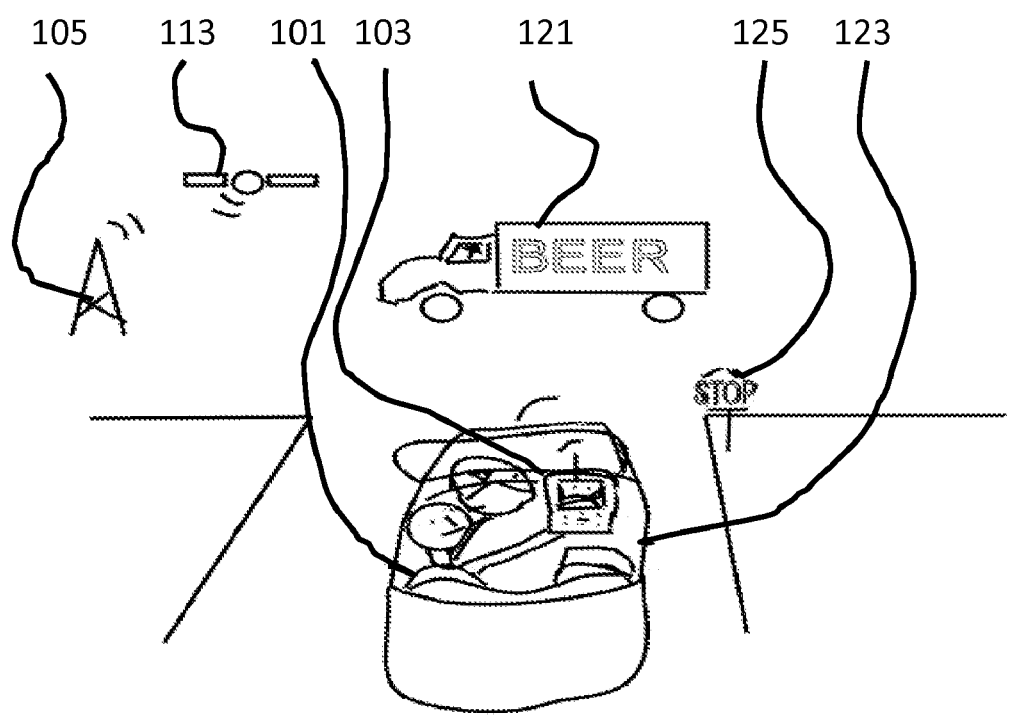
FIG. 3 shows a typical operator attempting communicating while driving

FIG. 3 shows a typical operator attempting communicating while driving. In FIG. 3 operator 101 is shown behind the wheel of the vehicle 123 while utilizing device 103 driving down a roadway towards a stop sign 125. The tower 105 is shown to relay operator 101 communications to the desired party. Also shown is the satellite 113 for position/velocity determination. Shown beyond the stop sign 125 is the obstacle 121. The operator 101 may be talking, listening, texting, or even viewing a video with the device 103 over tower 105. All the communicating choices available to operator 101; talking, listening, texting, or even viewing a video are distracting and will at some level compromise operator 101 to recognize the stop sign 125, process the appropriate reaction, apply the brakes, come to a complete stop and avoid hitting or getting hit by the obstacle 121.

Figure 4:
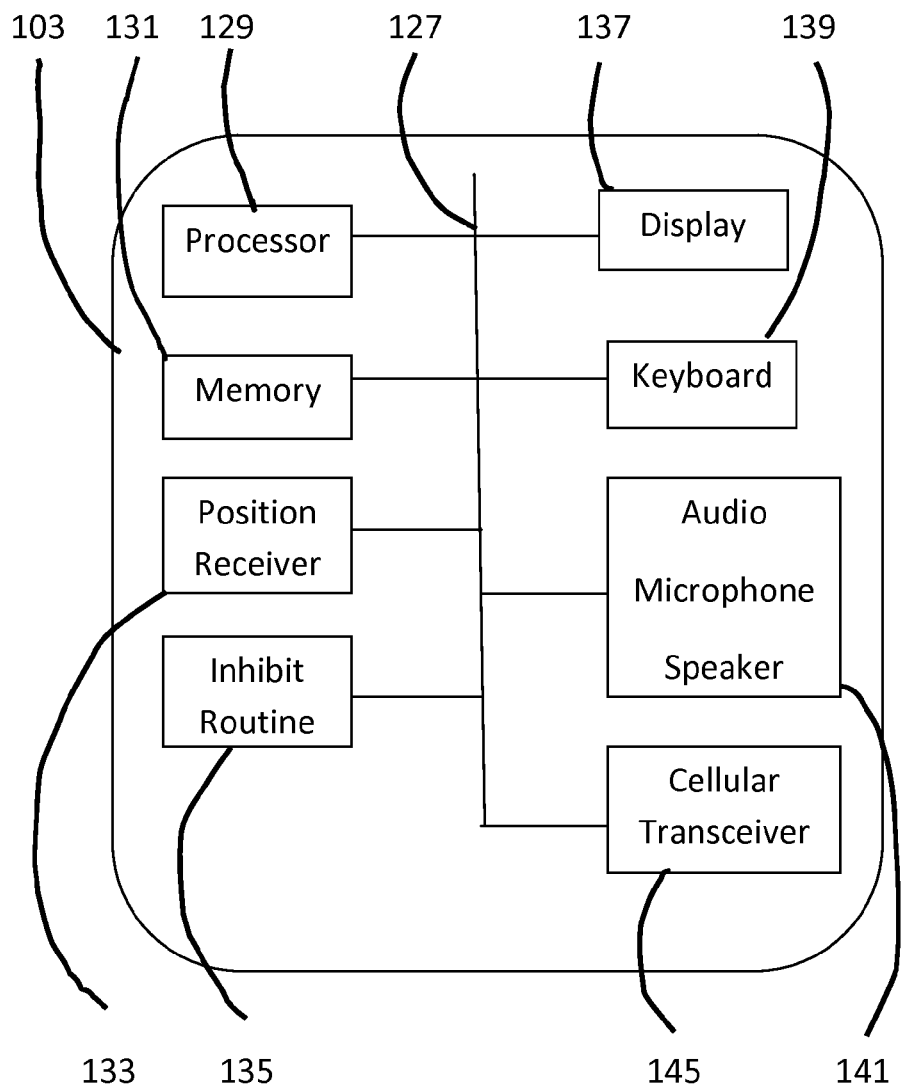
FIG. 4 shows a typical comm blocker block system diagram

FIG. 4 shows a typical comm blocker block system diagram. The test blocker system block diagram of device 103 is typically centered around a system bus 127 that features a processor 129 to coordinate and operate machine readable code and routines a portable device communication functions. A memory 131 module is shown to store and make available to the processor 129 machine readable code and routines. A position/location receiver 133 such as a GPS receiver is shown to track and provide location information of the device 103. A machine readable velocity determining and inhibit routine 135 is shown that supplies routines to the processor 129 periodically reviews position/location information from receiver 133 and memory 131 and determines if a threshold of velocity for the device 103 is reached and provides an alert to the processor 129. A display 137 is provided for the operator to receive visual information and interact with the device 103. A keyboard 139 is also provided for operator entry and response, while additional complementary keyboard devices such as trackballs, mice, touch screens, or similar devices are not shown they should be considered extensions of the device 103 entry systems. An audio 141 interface is shown typically consisting of a speaker or set of speakers, a microphone. While not shown communication interfaces to a vehicle communication system by wire or wirelessly (such as Bluetooth or WiFi) should be considered extension of this invention. A cellular transceiver 145 is shown to connect the device 103 to the provider's towers and central office as shown in previous figures.

Figure 5:
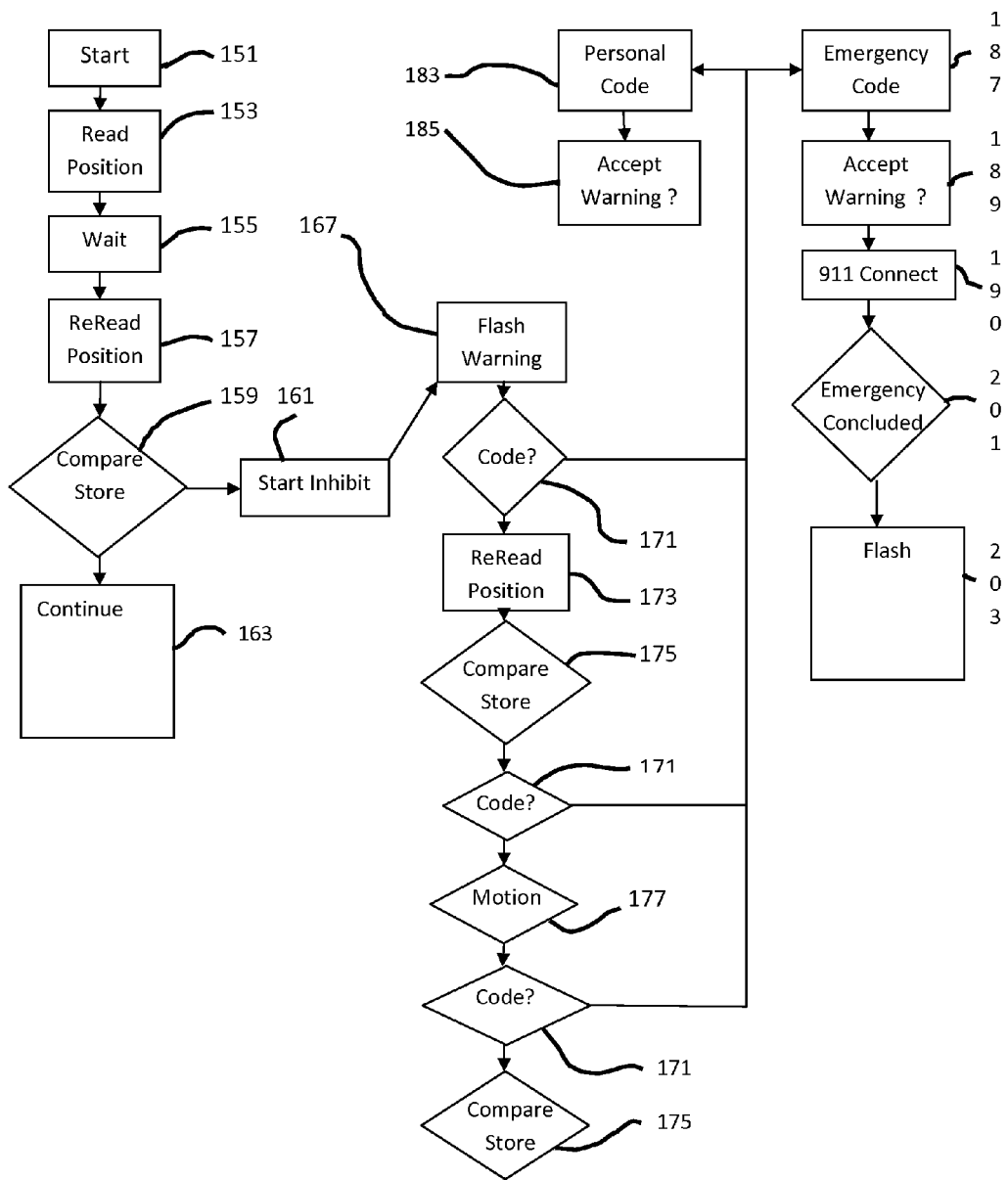
FIG. 5 shows a typical comm blocker inhibit routine flow diagram

FIG. 5 shows a typical comm blocker inhibit routine flow diagram. The typical comm blocker inhibit routine consisting of machine readable and executable code for a portable communication device initiates with a start block 151 that initiates when the device is turned on. A read position block 153 retrieves the initial starting position of the device from the receiver 133 and stores this position information in the system memory 131 shown in FIG. 4. Returning to FIG. 5 the routine will wait a short period block 155 and reread the device position from the receiver 133 in block 157. Next a decision block 159 determines the distance traveled by subtracting the second position from the previous position. This distance traveled is divided by time interval of block 155 and a rate of travel or velocity is determined. A preset threshold tells the routine if the safe velocity threshold has been met or exceeded and if not the operations continue to block 163 as normal with no inhibit imposed. The inhibit routine will monitor each cycle as a background routine with no additional action or intervention until detection of movement beyond the established threshold is detected. If the velocity threshold has been met or exceeded an "inhibit" block 161 is entered then a visual warning 167 is displayed on the device screen and inhibit state will be entered. Inhibit state will prevent receiving and transmission by the operator through this device during movement beyond the threshold and timeout occurs or a bypass code is entered. Sequentially next a decision block 171 monitors for an operator code to override the inhibit. A preselected code for emergencies is typically set to monitor for 911. When an operator enters 911 under the inhibit routine the inhibit routine is suspended in block 187 and the device and operator are connected in block 190 to a 911 emergency line with an accept warning 189 but no inhibit and connection to 911 emergency operators as would be normally without comm blocker functionality. When the emergency is concluded the system will ask the operator if the emergency was concluded block 201 if yes or the operator doesn't enter anything and the block 201 times out at a preselected time the routine will return to block 151. If the operator informs the routine that the emergency has not concluded the operator will have full usage of the device through block 203 for other necessary communications. After each communication a warning block 205 will display a warning and the routine will return to block 201 to determine if additional emergency communications are necessary. If more are necessary the same block 203 steps will allow the operator to communicate and resolve the emergency, when the emergency is concluded or timed out the device returns to block 151. When the operator enters a pre-established personal responsibility code (default is typically 411) during an inhibit block 163 for situations where an operator is a passenger in a vehicle or such a personal code block 183 is entered and a warning is displayed and the operator is informed of assumption of reliability by the operator and asked to confirm in block 185 if the operator accepts the liability the routine goes to block 161 for normal operations. After each communication the personal code must be reentered. If the operator does not accept the responsibility the warning block 167 will flash the warning and inhibit will preclude receiving and transmitting. The routine will continue the inhibit and monitor for entry of emergency or personal codes while the device is in motion. Periodically the routine will monitor that the device is still in motion in block 173 above the threshold in block 175. The warning will be refreshed if the device motion is sustained above the predetermined threshold and sequenced through block 167. If motion has ceased in block 175 the position will be stored in block 177 a predetermined delay will be imposed by block 177 to prohibit communicating at stop signs or lights. When the predetermined delay is met a comparison of position in block 179 determines if the inhibit should be lifted. If the device has moved beyond a predetermined distance the routine will flash the warning through block 167 and reinitiate the inhibit routine. If the predetermined time has been met and the distance has not been experienced the routing will go to block 161 for normal operation. The inhibit routine during normal operation will reinitiate from start every 10 seconds or at a predetermined time as appropriate for the users.

Figure 6:
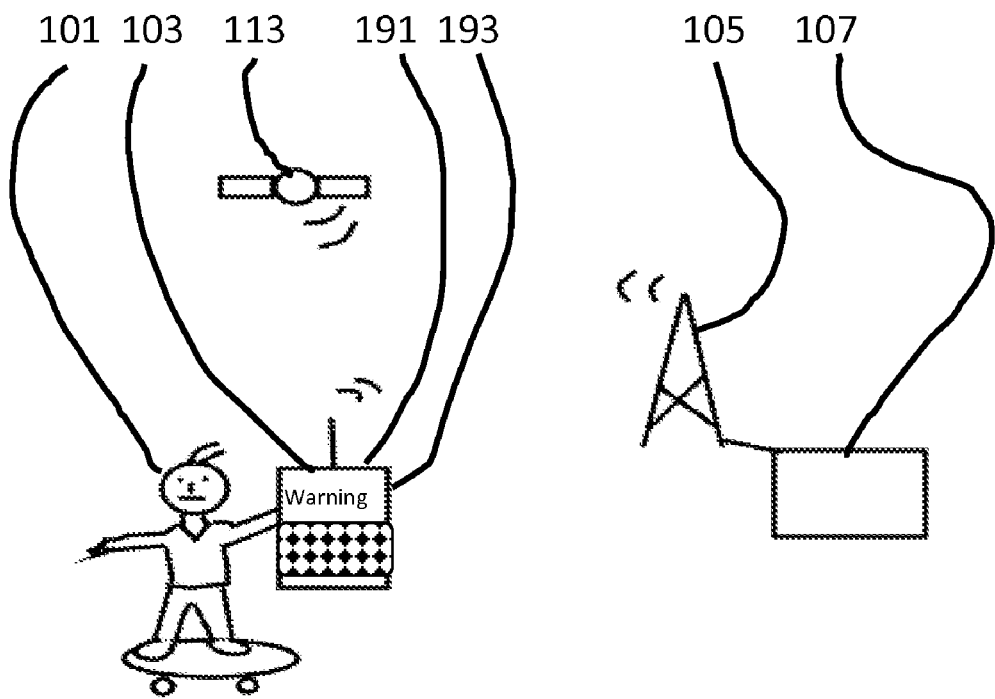
FIG. 6 shows a typical device being configured with a comm blocker implementing routine

FIG. 6 shows a typical device being configured with a comm blocker implementing routine. The operator 101 skateboarding with the device 103 experiencing an inhibit from the comm blocker routine is shown with inhibit 191 (Warning shown on screen) displayed in the device display 193. The device 103 experiencing this inhibit will not be able to send or receive communications until the conditions discussed in FIG. 5 are met or satisfied. The operator is shown on a skateboard, obviously unsafe to ride a skateboard or operate any vehicle while communicating. The tower 105 and office 107 are available for emergencies and satellite 113 will keep updating the device 103 until movement has dropped below the threshold, emergency code, or personal code is entered.

Figure 7:
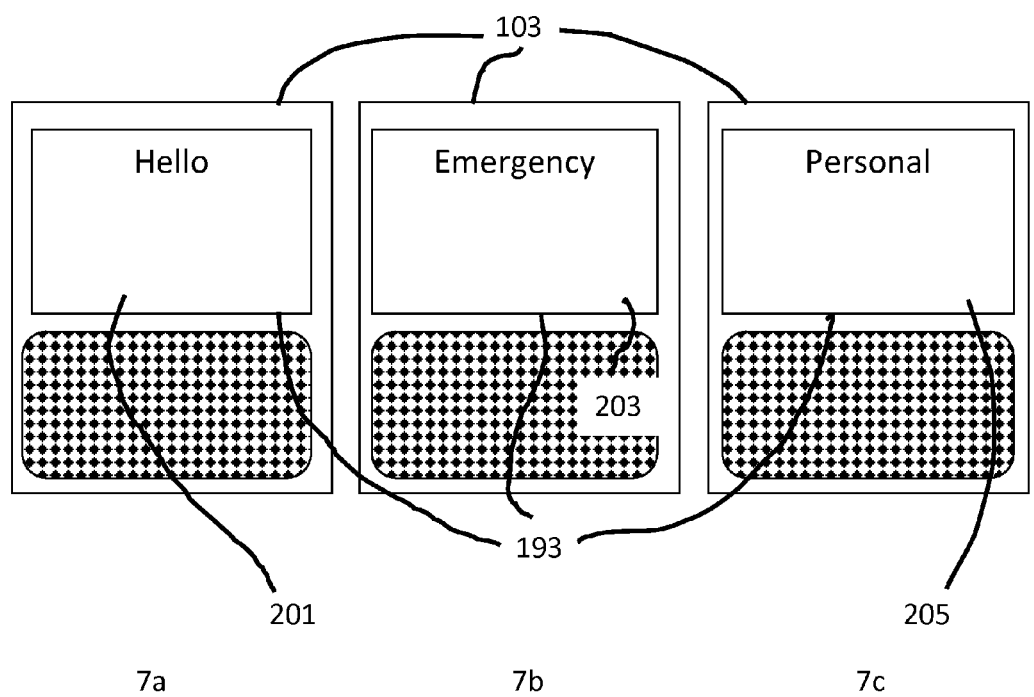
FIG. 7 shows a typical comm blocker display when not restricted and override screens

FIG. 7 shows a typical comm blocker display when not restricted and override screens. The FIG. 7 displays the 3 typical non inhibited display screens on device 103. A FIG. 7a shows a device 103 with a Hello 201 on the display 193. The Hello display message 201 informs the operator that all communication services that are normally available are not inhibited. A FIG. 7b shows a device 103 with an Emergency display message 203 on the display 193. The Emergency 203 informs the operator that a 911 bypass code has been entered and the device 103 is connecting to 911 emergency services available in the area of coverage. A Personal Responsibility display message 205 on the display 193 informs the operator that a personal override code (default 411) has been entered and the operator is accepting all responsibility for the override. A corresponding processor generated voice message will also inform the operator of any inhibit, emergency override or personal override.

Figure 8:
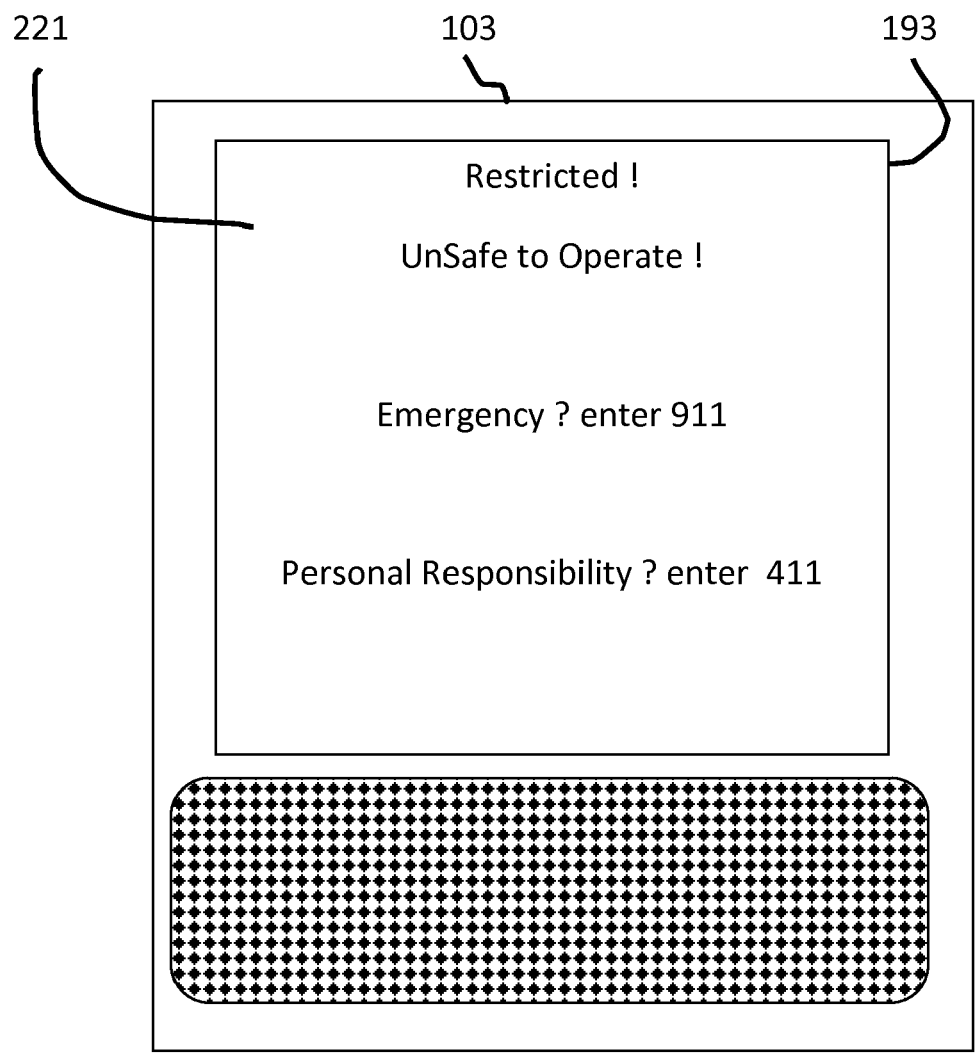
FIG. 8 shows a typical comm blocker display when restricted

FIG. 8 shows a typical comm blocker display when restricted. The FIG. 8 display shows the details of the device 103 information displayed 221 to an operator on display 193 when the movement threshold has been reached. The information displayed 221 informs the operator that all communications will be restricted as it will be unsafe due to the movement threshold being met or exceeded. Immediately below the announcement of Restricted Unsafe are two options on displayed 221 that the operator can select (by touch or voice command if so equipped or keypad/keyboard depending on device functionality) for override of restriction/inhibit. A voice notification will also be simultaneously sent to the operator for audible notification of the operator where a headset or speakerphone is in use.

FIG. 9 shows a typical comm blocker display when not restricted with safety override. The emergency safety override initial screen message 225 is shown on display 193 on device 103 informing the operator that the emergency code 911 (default emergency safety code) has been entered. The operator can continue with seamless connection to regional emergency services or cancel by selecting the cancel option on the last line of message 225.

FIG. 10 shows a typical comm blocker display when not restricted with personal override. The personal override initial screen message 227 is shown on display 193 on device 103 informing the operator that the personal code 411 (default personal code) has been entered. The operator can continue with seamless connection to normal communication services or cancel by selecting the no option to not select accepting responsibility on the last line of message 227.

Figure 11:
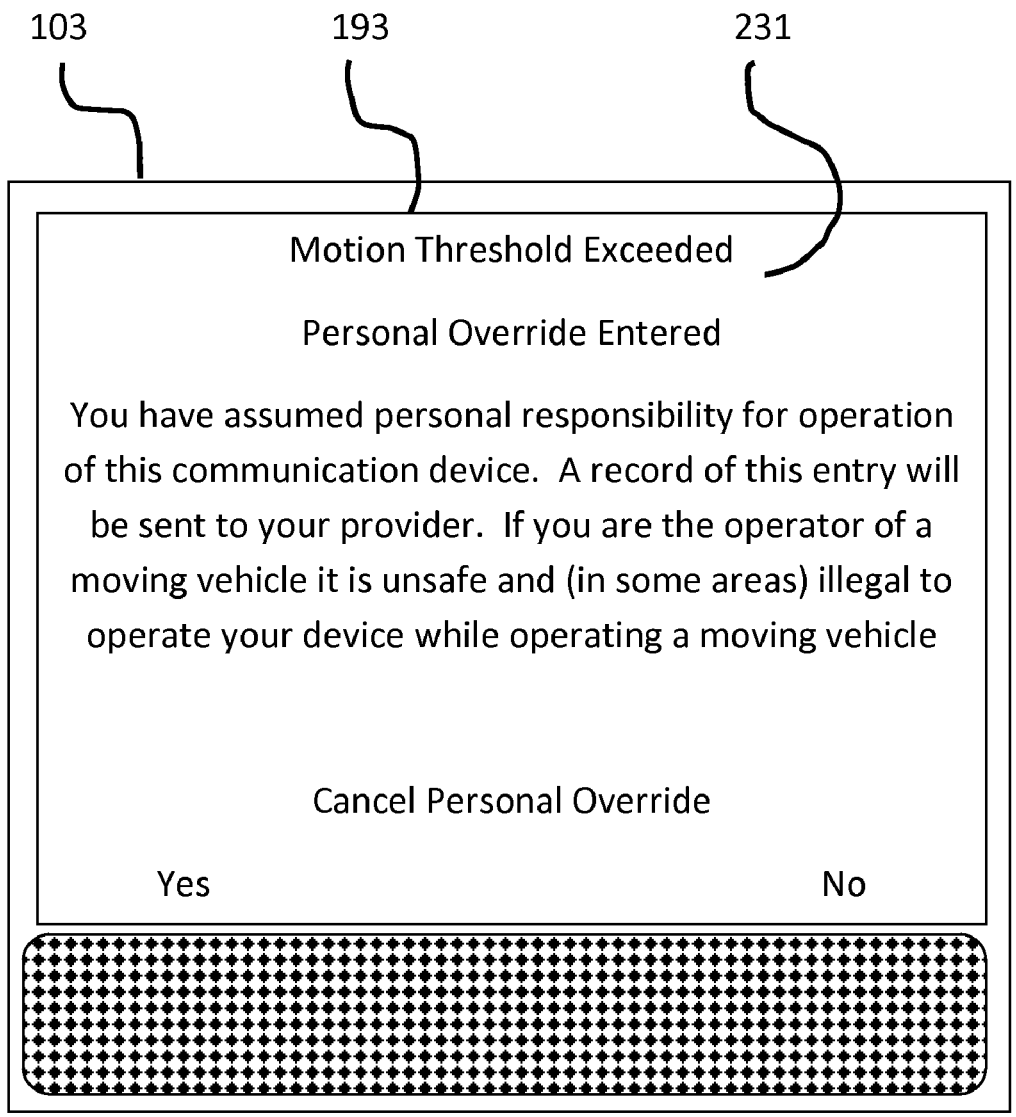
FIG. 11 shows a typical comm blocker display notice for personal override responsibility.

FIG. 11 shows a typical comm blocker display notice for personal override responsibility. An operator having entered the personal code 411 for personal override of communications restriction/inhibit will be presented with the message 231 on display 193 on device 103 and an audible notice. The message 231 will typically inform the operator that the motion threshold has been met or exceeded and a personal override code has been entered. Additionally the operator is informed that operator assumes all responsibility for liability that may occur due to distractions and that a record of this message is being sent to the provider. A cancel option is presented to the operator at the bottom of the message 231 to cancel the override request. The intent of the personal override is for operators to be able to communicated when they are passengers or otherwise moving where communications will not put themselves, others, or property in danger from the distraction of communicating while moving. When the operator chooses to enter a personal use code to override a restriction/inhibit a record of the override message and notice are sent to the communications provider and may be material to any incurred liability resulting from abuse of the personal override function for example when the operator is actually the driver of a vehicle.

Figures 12A, 12B, 12C:
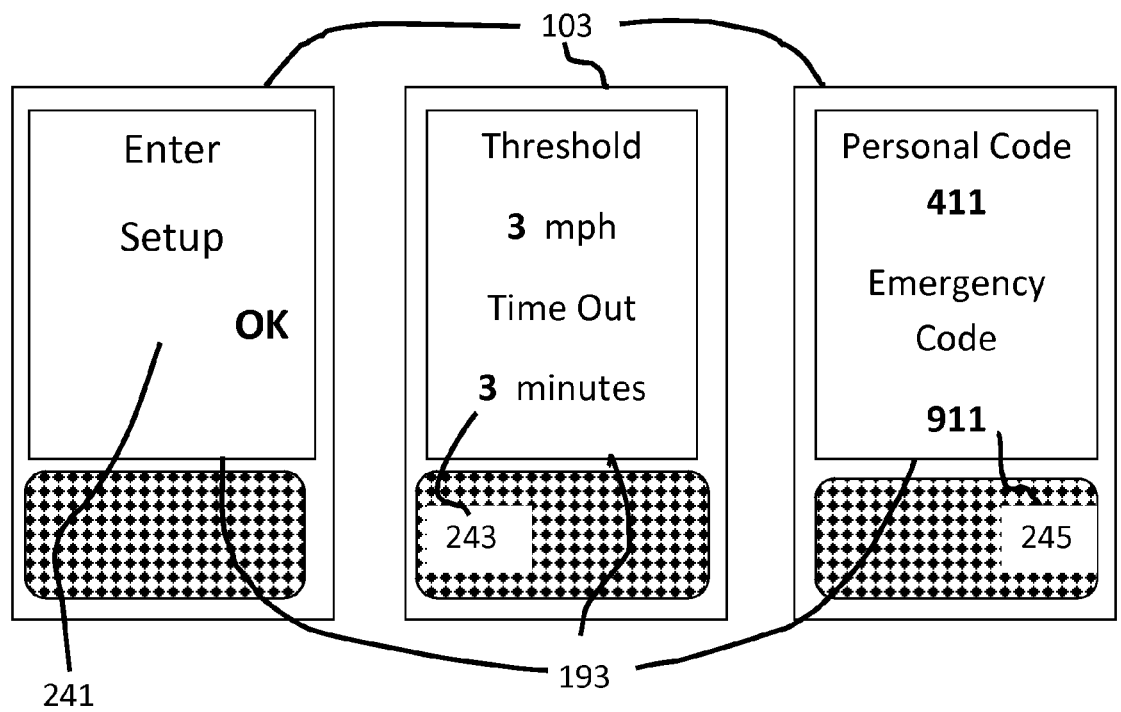
FIG. 12 shows a typical comm blocker threshold and code set up

FIG. 12 shows a typical comm blocker threshold and code set up. A set up of a comm blocker system has 3 simple screens shown in FIG. 12a that are typically only available on startup or initiation are shown on device 103 display 193 is message 241 informing the operator that Enter Set Up with an OK button to enter set up. The screen in FIG. 12a is typically entered by simultaneously pressing control and enter buttons and entry of a unique security code but may vary depending on device capabilities. When a device 103 is equipped with voice commands a simple "enter set up" will typically be used to enter this set up shown in FIG. 12a. When the operator selects OK by physically selecting or voice command or other appropriate command for the device 103 FIG. 12b will display a screen message 243 on device 103 display 193. The first line informs the operator that Threshold of motion or velocity can be set in miles per hour (mph) box with a default of 3 mph shown in the mph box. Additionally the Time out (the time from when movement has ceased until communications will no longer be restricted/inhibited) can be set in minutes with a default of 3 minutes shown in the minutes box. The operator can leave these values or reset by entering the desired number in the appropriate boxes to a more appropriate value as the operator may safely operate. When OK has been selected by the operator FIG. 12c will display a screen message 245 on device 103 display 193 to set code override entry numbers. The first line of message 245 displays Personal Code which is 411 by default, the operator can change this number to a more appropriate 3 digit number by entering the replacement number in the box below Personal Code. Immediately below the Personal Code box is Emergency Code with 911 in the code box below Emergency Code the operator can change this number to adapt to regional emergency codes. When OK is selected these values will be recorded and be part of any override message. Set up of comm blocker values will typically be restricted with code protection to prohibit casual or otherwise changing setting of a device. Operators that select numbers to defeat the purpose of safety overrides will have these numbers included in messages sent to the communications provider when the override is incurred or "tricked" for example if any velocity threshold above 5 mph is entered or time out of less than 3 minutes is employed each time the device is turned on a message with questionable parameters will be sent to the communications provider for recording and possible operator liability.

In incidents such as:
government vehicles
city busses/school busses
private delivery companies
parents of children under 18 years of age
etc.

Have the authority to turn that option off and/or unauthorized to the user of the vehicle from even confirming such a task, because there will be individuals that will take advantage of such.

Operation

To safely operate the present invention for blocking mobile communications an operator will typically load the comm blocker routine into the mobile device through the docking port or through download. Once the routine is resident in the mobile device the parameters can be adjusted as shown in FIG. 12. All adjustments will be logged and a record of the parameter values sent to the provider. The comm. blocker routine will run in the background at a very low power consumption rate and only use power consuming screen displays when active during inhibit actions as described in FIG. 5

DESCRIPTION OF THE PREFERRED EMBODIMENT(S)

The description of the preferred embodiment of the present invention is shown with a system architecture in FIG. 4 and a routine flow in FIG. 5. Three typical displays of the comm. blocker are shown in FIG. 7. All processor usage and screen displays are kept to a minimum in comm. blocker to minimize power consumption.

What is claimed is:

1. A control system for internally controlling a mobile communication system, the mobile communication system internally inhibiting communication of a mobile communication device when the communication device achieves a threshold of predetermined momentum, a motion monitoring routine internal to the mobile communication device initiates with device turn on and periodically updates momentum, inhibiting device usage if motion is sustained, when the motion monitoring routine does not detect device motion above the threshold no inhabitation is deployed and full usage including connection to a cellular network and provider is available, a inhibit safety override is facilitated for emergencies or other circumstances, a time out of inhibit when motion has ceased below the threshold for a sustained period, comprising:
a processor,
a memory,
a routine for measuring momentum,
an ability to inhibit a mobile device's functionality,
a connection to a cellular network,
a threshold set level for maximum momentum,
a safety override facility where the operator enters a preset emergency code (predetermined emergency number) bypassing the inhibit,
a personal responsibility override where the operator enters a preset personal code bypassing the inhibit,
a personal code can be adjusted with a record of the value recorded and sent to the cellular provider,
a personal code warning(s) offer an additional warning to the operator advising of assumed liability when misusing personal codes,
a time delay set level for cessation of momentum to reset full operational capabilities, and
wherein the communications device is inhibited from all types of communications and other usages for safety and responsibility purposes when the device is in motion above a threshold.

2. The system according to claim 1 wherein processor is any basic processing device as all routines implementing the comm blocker are simple and short.

3. The system according to claim 1 wherein memory usage to implement comm blocker is minimal using device resources.

4. The system according to claim 1 wherein the comm blocker routine runs continuously in the back ground on the device processor.

5. The system according to claim 1 wherein inhibit techniques continuously monitors the device for motion beginning on start up.

6. The system according to claim 1 wherein the cellular provider is sent a record of any parameter changes or overrides.

7. The system according to claim 1 wherein momentum threshold can be adjusted with a record of the value recorded and sent to the cellular provider.

8. The system according to claim 1 wherein emergency code can be adjusted with a record of the value recorded and sent to the cellular provider.

9. The system according to claim 1 wherein time delay value can be adjusted with a record of the value recorded and sent to the cellular provider.

10. The system according to claim 9 wherein time delay warnings advise the operator to safely use communication resources.

11. A method of internally controlling a mobile communication system, the method internally inhibiting communication of a mobile communication device when the communication device achieves a threshold of predetermined momentum, monitoring motion through a routine internal to the mobile communication device initiating when the device turns on and periodically updates momentum, inhibiting device usage if motion is sustained, when the motion monitoring routine does not detect device motion above the threshold no inhabitation is deployed and full usage including connection to a cellular network and provider is available, a inhibit safety override is facilitated for emergencies or other circumstances, a time out of inhibit when motion has ceased below the threshold for a sustained period, the method comprising:

processing device motion, initiating device status from memory, measuring device momentum with an internal routine, inhibiting a mobile device's functionality when momentum is detected, connecting to a cellular network for remote mobile communications, setting a threshold set level for maximum momentum of a device to determine inhibit instantiation, overriding safety facility where the operator enters a preset emergency code (predetermined emergency number) bypassing the inhibit, overriding personal responsibility where the operator enters a preset personal code bypassing the inhibit, a personal code can be adjusted with a record of the value recorded and sent to the cellular provider, a personal code warnings offer an additional warning to the operator advising of assumed liability when misusing personal codes, setting delay level for cessation of momentum to reset full operational capabilities, and inhibiting the communication device from all types of communications and other usages for safety and responsibility purposes when the device is in motion above a threshold.

12. The method of claim 11 wherein processing requirements are kept to a minimum enabling use of simple device processor.

13. The method of claim 11 wherein memory requirements are kept to a minimum enabling use of simple device memory.

14. The method of claim 11 wherein routine runs continuously in the back ground on the device processor.

15. The method of claim 11 wherein inhibit techniques continuously monitor the device for motion beginning on start up.

16. The method of claim 11 wherein the cellular provider is sent a record of any parameter changes or overrides.

17. The method of claim 11 wherein momentum threshold can be adjusted with a record of the value recorded and sent to the cellular provider.

18. The method of claim 11 wherein emergency code can be adjusted with a record of the value recorded and sent to the cellular provider.

19. The method of claim 11 wherein time delay value can be adjusted with a record of the value recorded and sent to the cellular provider.

20. The method of claim 19 wherein time delay warnings advise the operator to safely use communication resources.

* * * * *

UNITED STATES PATENT AND TRADEMARK OFFICE
CERTIFICATE OF CORRECTION

PATENT NO. : 8,340,730 B2  
APPLICATION NO. : 12/800204  
DATED : December 25, 2012  
INVENTOR(S) : Pallotta Page 1 of 1

It is certified that error appears in the above-identified patent and that said Letters Patent is hereby corrected as shown below:

In the Claims

Claim 1 Col 8 line 35 should read; warning(s) that  
Claim 1 Col 8 line 41 should read; usages, while overriding the inhibit for safety and personal responsibility communication purposes  
Claim 11 Col 10 line 7 should read; usages, while overriding the inhibit for safety and personal responsibility communication purposes Signed and Sealed this  
Twenty-fifth Day of February, 2014

Michelle K. Lee  
*Deputy Director of the United States Patent and Trademark Office*